United States Patent

Temme et al.

[11] Patent Number: 5,996,753
[45] Date of Patent: Dec. 7, 1999

[54] DRIVE DEVICE FOR CURRENT-GENERATING UNITS FOR MOTOR VEHICLES

[75] Inventors: Jorge Temme, Heideweg; Dietmar Weissflog, Wasserkampstr, both of Germany

[73] Assignee: The Torrington Company, Torrington, Conn.

[21] Appl. No.: 09/031,996

[22] Filed: Feb. 27, 1998

[30] Foreign Application Priority Data

Mar. 7, 1997 [DE] Germany .............................. 197 09 479

[51] Int. Cl.$^6$ ............................................ F16D 41/06

[52] U.S. Cl. .............................................. 192/45; 192/110 B

[58] Field of Search ................................. 192/41 R, 45, 192/110 B, 113.32; 474/70, 902, 903; 310/78, 110; 322/12, 40, 41, 42, 43

[56] References Cited

U.S. PATENT DOCUMENTS

| | | | |
|---|---|---|---|
| 3,194,368 | 7/1965 | Benson et al. | 192/45 |
| 4,725,259 | 2/1988 | Miyata | 474/70 |
| 5,042,628 | 8/1991 | Malecha | 192/41 R X |
| 5,575,366 | 11/1996 | Zenmei et al. | 192/45 |
| 5,617,937 | 4/1997 | Zettner et al. | 192/45 |
| 5,675,202 | 10/1997 | Zenmei et al. | 192/45 X |
| 5,695,031 | 12/1997 | Kurita et al. | 192/45 |

FOREIGN PATENT DOCUMENTS

2017706 B2  7/1979  Germany ................................. 192/45

*Primary Examiner*—Richard M. Lorence
*Attorney, Agent, or Firm*—John C. Bigler

[57] ABSTRACT

A drive device for a current-generating unit suitable for use in motor vehicles has a freewheel, between a driving part and a driven part, for the purpose of damping out rotational oscillations, as a result of which load peaks are reduced and service life is increased.

8 Claims, 1 Drawing Sheet

DRIVE DEVICE FOR CURRENT-GENERATING UNITS FOR MOTOR VEHICLES

BACKGROUND OF THE INVENTION

This invention relates generally to a drive device for current-generating units, as might be used for example in motor vehicles.

In practice, the driving part connected to a motor vehicle engine was previously rigidly connected to the current-generating unit. The driving part is in particular a belt pulley driven from the motor vehicle engine. At low rotational speed and/or in the case of spasmodic operation of the motor vehicle engine, in particular in the case of a diesel engine, rotational oscillations are transmitted from the latter to the driving part and/or to the belt pulley and thus directly to the current-generating unit. As a result of the severe accelerations and decelerations which are produced in this way, a very severe load is placed not only on the drive belts between the motor vehicle engine and the driving part to of the current-generating unit, but also on the bearings of this unit, so that the drive belts and/or the bearings of the current-generating unit have only a relatively short service life. Accordingly, there is a need to provide a drive device in which such rotational oscillations and the loadings brought about thereby are eliminated or at least greatly reduced, in order to increase the operating service life of the drive device.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a drive device for current-generating units, the drive device comprising a driving part, a driven part to be connected to the current-generating unit and a freewheel between the driving part and the driven part.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

With the present invention, although the drive power is transmitted from the motor vehicle engine to the current-generating unit, a freewheel balances out accelerations and decelerations in the drive. In that way, the oscillations in rotational speed of the motor vehicle engine are rectified or compensated for and act on the drive device or on its driven part to a reduced extent at the most. Accelerations and decelerations on the drive belt and on the bearings, and the severe loadings associated therewith, are reduced in this way, so that the drive device has a prolonged service life.

Figure 1:
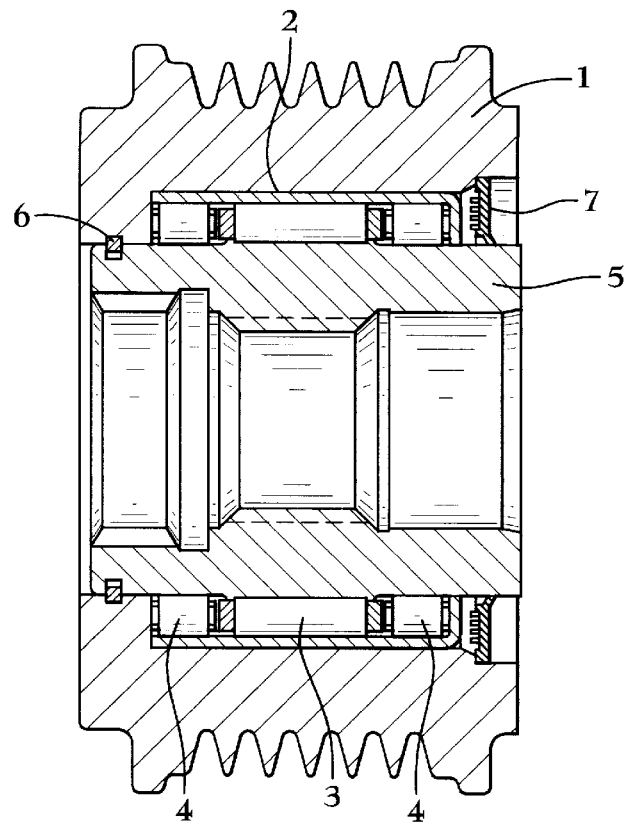
FIG. 1 is an axial section through the drive device.
Figure 2:
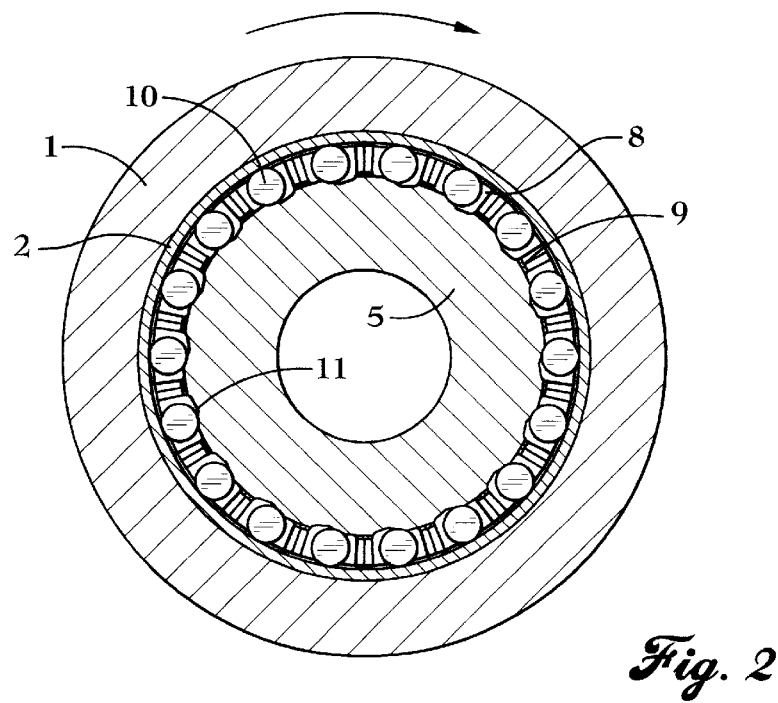
FIG. 2 is a cross section through the drive device.

Referring now to FIGS. 1 and 2, the drive device has an outer ring 1, which is designed in the exemplary embodiment as a belt pulley, and which is connected to a motor vehicle engine, for example via belts, which are not shown, and constitutes the driving part for the drive device of a current-generating unit. The driven part, which is connected to the current-generating unit, likewise not shown, is formed by an inner ring 5. Located between the outer ring 1 and the inner ring 5 is a freewheel 3 having free wheeling or clamping rollers 10 which are guided in a freewheel cage 9 and are acted on by springs 8 which are fastened on the freewheel cage 9.

Located on the inner ring 5 are clamping ramps 11 into which the clamping rollers 10 are pressed by means of the springs 8. When the outer ring 1 rotates in the direction of the arrow according to FIG. 2 as the driving part, the inner ring 5 is carried along via the clamping rollers 10 acting on the clamping ramps 11. In the opposite direction of rotation, the belt pulley 1 runs freely. In the event of rotational oscillations in the drive of the outer ring 1, the freewheel 3 thus comes into effect, in that the clamping rollers 10 are released by the clamping ramps 11, with the result that the drive connection between outer ring 1 and inner ring 5 is temporarily canceled and comes into effect once more after a time delay. This operation achieves a compensation of rotational oscillations which act on the outer ring 1 in relation to the driven inner ring 5.

In addition to the freewheel 3, in the exemplary embodiment shown, at least one roller bearing 4 is provided between the outer ring 1 and the inner ring 5 in order to guide the outer ring 1 with respect to the inner ring 5. In this exemplary embodiment, two roller bearings, in particular cylindrical roller bearings or needle roller bearings 4 are provided, one of which is in each case arranged on each axial side of the freewheel 3. As the drawing further shows, a bearing sleeve 2 is arranged between the outer ring 1 and the freewheel 3 and the roller bearings 4.

This sleeve 2 is in particular a sleeve which is drawn without machining, and which is pressed into the outer ring 1. This bearing sleeve 2 thus forms the outer track for the bearing rollers or needles of the roller bearing 4 and for the clamping rollers 10 of the freewheel 3. The outer ring 1, in particular when it is designed as a belt pulley, as shown, can be produced by machining or designed as a casting. The pressed-in bearing sleeve 2, produced without machining, then results in a smooth outer track for the freewheel 3 and for the roller bearings 4. The inner ring 5 may have tracks, produced by machining, for the roller bearings 4 and freewheel ramps 11, which are produced without machining, in particular pressed in or stamped in.

The current-generating unit, which is not shown, which is also designated a dynamo or alternator, is fastened in the inner bore of the inner ring 5, for example by means of splines, and is centered on the diameter, and it can be secured by means of a screw threaded into the inner bore of the inner ring 5, so that the current-generating unit is rigidly connected to the inner ring 5.

The inner ring 5 can be guided axially with respect to the outer ring 1 by means of at least one laminated ring 6, also known as a laminar ring, which engages in circumferential grooves on the outer ring 1 and on the inner ring 5. This results in the freewheel 3 and the roller bearing 4 being sealed against the emergence of lubricating grease and against the entry of, for example, spray water. At the opposite side of the drive device, that is to say at that end of the structural unit thus formed which is opposite the laminated ring 6, a slip-ring seal 7 can be provided, by means of which the other end is sealed in a corresponding manner.

The invention provides a compact drive unit which is cost-effective to manufacture, which damps out the rotational oscillations produced by the motor vehicle engine and transmits these oscillations to the current-generating unit in a manner reduced as far as possible, with the result that the latter can operate uniformly and the structural unit has a long service life.

Having described the invention, what is claimed is:

1. A drive device for a current-generating unit, the drive device comprising:

a driving part including an outer ring;

a driven part including an inner ring to be connected to the current-generating unit; and a freewheel between the driving part and the driven part;

wherein the inner ring is guided axially with respect to the outer ring by means of a laminated ring engaging surfaces of the outer ring and the inner ring.

2. The drive device as claimed in claim 1, wherein a slip-ring seal is provided at that end of the device opposite the laminated ring.

3. The drive device as claimed in claim 1, wherein, in addition to the freewheel, at lest one roller bearing is provided between the outer ring and the inner ring.

4. The drive device as claimed in claim 1, wherein a cylindrical roller bearing or needle roller bearing is provided on each axial end of the freewheel.

5. The drive device as claimed in claim 3, wherein a bearing sleeve, in particular a sleeve drawn without machining, is arranged between the outer ring and the freewheel and the roller bearing, the bearing sleeve being pressed into the outer ring.

6. The drive device as claimed in claim 3, wherein the inner ring has at least one track, produced by machining, for the roller bearing, and freewheel ramps, produced without machining, for the freewheel.

7. The drive device as claimed in claim 6, wherein the freewheel has a cage with clamping rollers which are pressed against the freewheel ramps on the inner ring by means of springs acting on the cage.

8. The drive device as claimed in claim 3, wherein the outer ring is a belt pulley.

* * * * *